UNITED STATES PATENT OFFICE.

DONALD DAVIDSON, OF CHICAGO, ILLINOIS, ASSIGNOR TO BRADLEY & VROOMAN COMPANY, OF CHICAGO, ILLINOIS, A CORPORATION OF ILLINOIS.

METHOD OF STABILIZING POLYSULFIDS AND THE PRODUCTS OF SUCH METHOD.

1,338,678.   Specification of Letters Patent.   Patented May 4, 1920.

No Drawing.   Application filed October 6, 1919. Serial No. 328,948.

*To all whom it may concern:*

Be it known that I, DONALD DAVIDSON, citizen of the United States, residing at Chicago, in the county of Cook and State of Illinois, have invented a certain new and useful Improvement in Methods of Stabilizing Polysulfids and the Product of Such Methods, of which the following is a full, clear, concise, and exact description.

My invention relates to the stabilization of solid polysulfids which, without the addition of stabilizing means, would be unstable. In the process of the manufacture of such polysulfids they are initially in solution, being afterward dried to solid form. While the polysulfids are in solution in the process of their manufacture I add to their solution some proteid matter, as for example glue. This proteid matter is thoroughly dissolved and distributed in the solution whereafter the solution is reduced to solid form by sufficient evaporation of water to reduce the substances to particles of solid form. In this dry form the glue may be from three to fifteen per cent. of the weight of the mass. It is presumed that the glue is a mechanical addition to the polysulfid.

In practice there is a multiplicity of polysulfids in the solution that is formed in the process of their manufacture. For example such may be expressed by the formulas $CaS_4.9H_2O$ and $CaS_5.x(H_2O)$ to which would be added the desired proteid matter.

When the solid product has been formed by the evaporation of moisture the glue is sufficiently non-hygroscopic to protect the substance from attack by the moisture in the air, it being believed that polysulfids in crystalline form are incased within coatings of proteid. The polysulfids are therefore guarded from attack by the oxygen of the air. When polysulfids, treated with glue or other proteid matter, are of such a nature as to adapt them, when in solution, for employment as fungicides and insecticides upon plants or animals the proteid acts as an adhesive to cause the adherence of the polysulfids to the plants or animals.

Having thus described my invention I claim as new and desire to secure by Letters Patent the following:

1. The method of stabilizing a polysulfid which consists in including proteid matter in a solution therewith and evaporating moisture from the solution to reduce the polysulfid and the added proteid matter to solid form.

2. The method of stabilizing a polysulfid which consists in including proteid matter in the polysulfid solution formed in the manufacture of the polysulfid and evaporating moisture from the solution to reduce the polysulfid and the added proteid matter to solid form.

3. The method of stabilizing a polysulfid which consists in including glue in a solution therewith and evaporating moisture from the solution to reduce the polysulfid and the added glue to solid form.

4. The method of stabilizing a polysulfid which consists in including glue in the polysulfid solution formed in the manufacture of the polysulfid and evaporating moisture from the solution to reduce the polysulfid and the added glue to solid form.

5. A compound including a solid polysulfid in particles and proteid matter incasing such particles.

6. A compound including a solid polysulfid in particles and glue incasing such particles.

In witness whereof, I hereunto subscribe my name this 1st day of October, A. D. 1919.

DONALD DAVIDSON.